United States Patent [19]
Horton

[11] 3,768,857
[45] Oct. 30, 1973

[54] DISAPPEARING TWIST LOCK ASSEMBLY
[75] Inventor: Terry F. Horton, Whittier, Calif.
[73] Assignee: Utility Trailer Manufacturing Company, City of Industry, Calif.
[22] Filed: May 5, 1972
[21] Appl. No.: 250,578

[52] U.S. Cl. ........ 296/35 A, 105/366 B, 248/361 R
[51] Int. Cl. .............................................. B65j 1/22
[58] Field of Search ................................ 296/35 A; 280/DIG. 8; 105/366 B; 248/361 R

[56] References Cited
UNITED STATES PATENTS

| 3,159,111 | 12/1964 | Gutridge et al. | 105/366 B |
| 3,545,713 | 12/1970 | Mowatt-Larssen et al. | 248/361 R |
| 3,586,286 | 6/1971 | Pratt | 248/361 R |
| 3,643,906 | 2/1972 | Werner et al. | 248/361 R |
| 3,717,372 | 2/1973 | Carr | 296/35 A |

Primary Examiner—Leo Friaglia
Assistant Examiner—Leslie J. Paperner
Attorney—Charles G. Lyon et al.

[57] ABSTRACT

A disappearing twist lock assembly is mounted on the flat bed of a vehicle for securing a conventional box-like shipping container thereto. The lock assembly includes a housing mounted between parallel stationary walls and turnably supported thereon by means of oppositely projecting hollow trunnions. A twist lock member is mounted in the housing to turn about an axis intersecting the trunnion axis at right angles, and this member has an enlarged head to engage a shoulder within a receptacle provided on the shipping container. A lever is secured to the twist lock member and projects through both of said hollow trunnions. An overcenter spring connected between an extending end of the lever and the remote trunnion holds the twist lock member in either locked or unlocked position with respect to said housing.

11 Claims, 7 Drawing Figures

Patented Oct. 30, 1973

Patented Oct. 30, 1973

DISAPPEARING TWIST LOCK ASSEMBLY

This invention relates to a retractable latch mechanism for securing a conventional box-like shipping container to the flat bed of a vehicle such as, for example, a trailer or semi-trailer, or a railway car. The latching device may be referred to as a disappearing twist lock assembly because it is desirable that it disappear to an inoperative position below the flat bed of the vehicle during such time as the vehicle is used for purposes other than transporting containers. The twist lock feature concerns a locking member which is turned about its longitudinal axis to project a locking head over a shoulder in a receptacle provided on the container.

Freight-carrying containers are of conventional design and come in standardized sizes. However, a particular vehicle may be used to carry either two short containers or one long container. In such event, certain of the latch assemblies must be retracted below the level of the flat bed of the vehicle. It is therefore an important object of this invention to provide disappearing twist lock assemblies which can be employed either upon existing flat bed vehicles or upon new vehicles specially constructed to receive them.

An advantageous feature of the present invention is that the entire disappearing twist lock assembly requires only a minimum of lateral space on the flat bed vehicle, so that it may be placed along side a center web of the side beam of an existing flat bed vehicle. This is an important structural advantage as compared to use of a conventional wide latch assembly which requires removal of a substantial portion of the side beam in order to position the locking elements at the right location to enter the standardized receptacle on the container.

The solution to the problem of providing a universal disappearing twist lock assembly useful for both existing and new vehicles utilizes a narrow elongated body defined by parallel stationary plates. The body may thus be positioned in an opening cut through the top flange of the side beam of the vehicle but without requiring damaging removal of the principal load carrying web of the beam. A housing is positioned between body side plates and is provided with oppositely projecting hollow trunnions which are received within bearing openings provided on the side plates. The housing may thus move through about one-quarter turn from a retracted position between the body plates and below the surface of the flat bed of the vehicle, to an operative position in which it projects upward above the flat bed. A twist lock member is mounted in the housing to turn about a second axis intersecting the trunnion axis at right angles. A portion of the twist lock member projects above the housing and is provided with a laterally extending offcenter head. When the head is aligned with the housing, both pass through an elongated opening in a standardized receptacle of the container, when the container is lowered into position on the flat bed. A lever secured to the twist lock member projects through both of the hollow trunnions and is used to turn the twist lock member and its head so that the latter overlies a shoulder within the receptacle, thereby latching the container to the vehicle. An overcenter spring is connected between an extending end of the lever and the remote trunnion for holding the twist lock member in either locked position or unlocked position with respect to the housing.

Other and more detailed objects and advantages will appear hereinafter.

Figure 1:
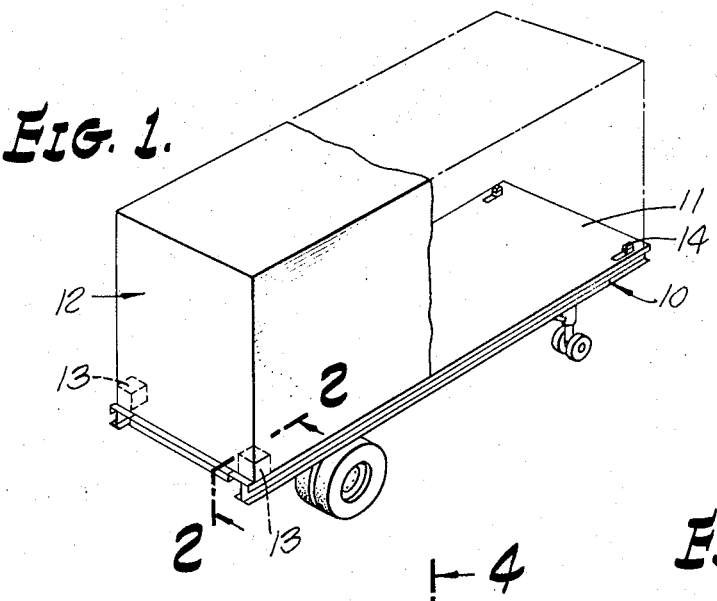
FIG. 1 is a perspective view partly broken away showing a box-like container for freight mounted upon the flat bed of a semi-trailer.
Figure 2:
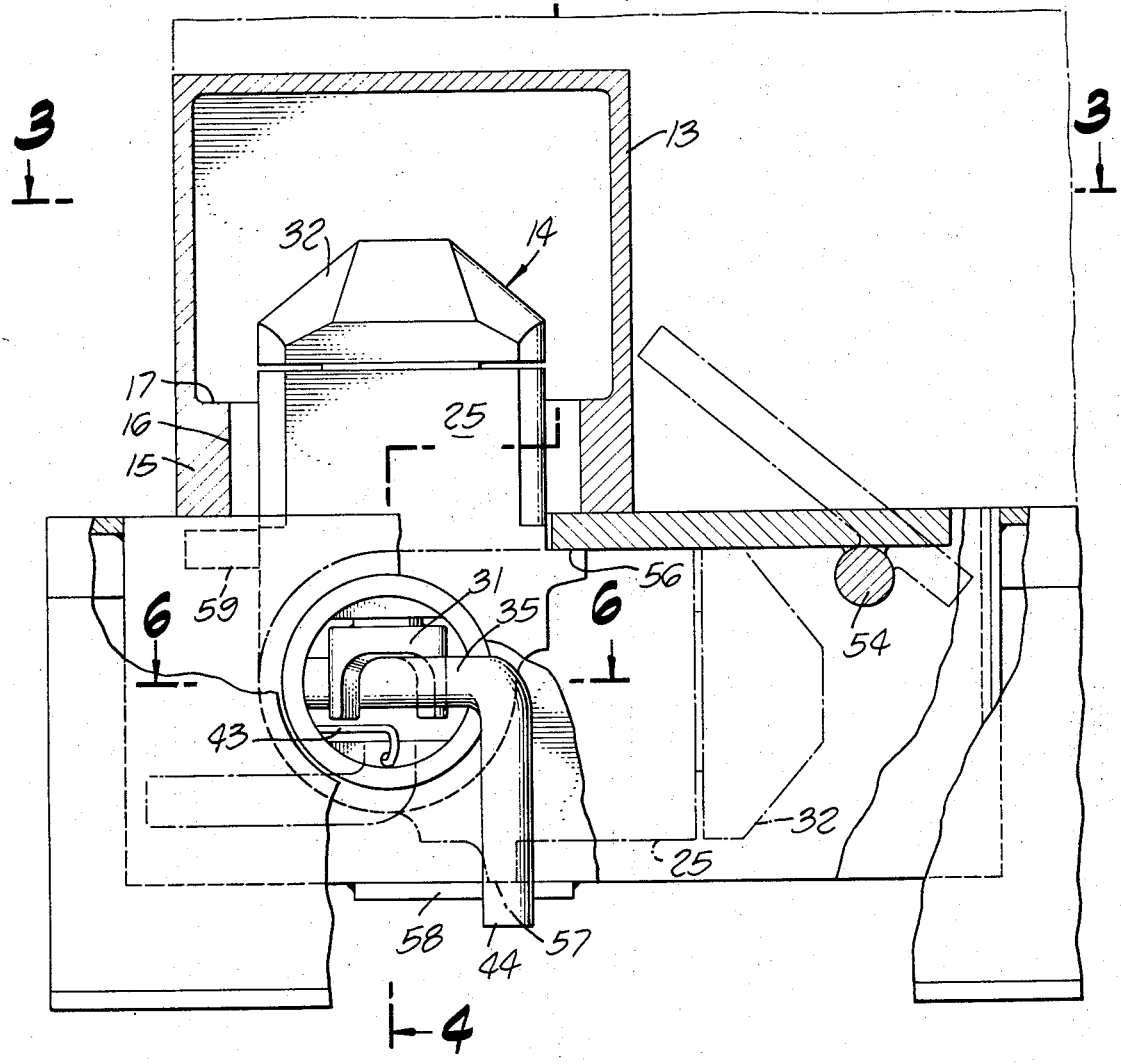
FIG. 2 is a sectional side elevation partly broken away taken substantially on the lines 2—2 as shown in FIG. 1.
Figure 4:
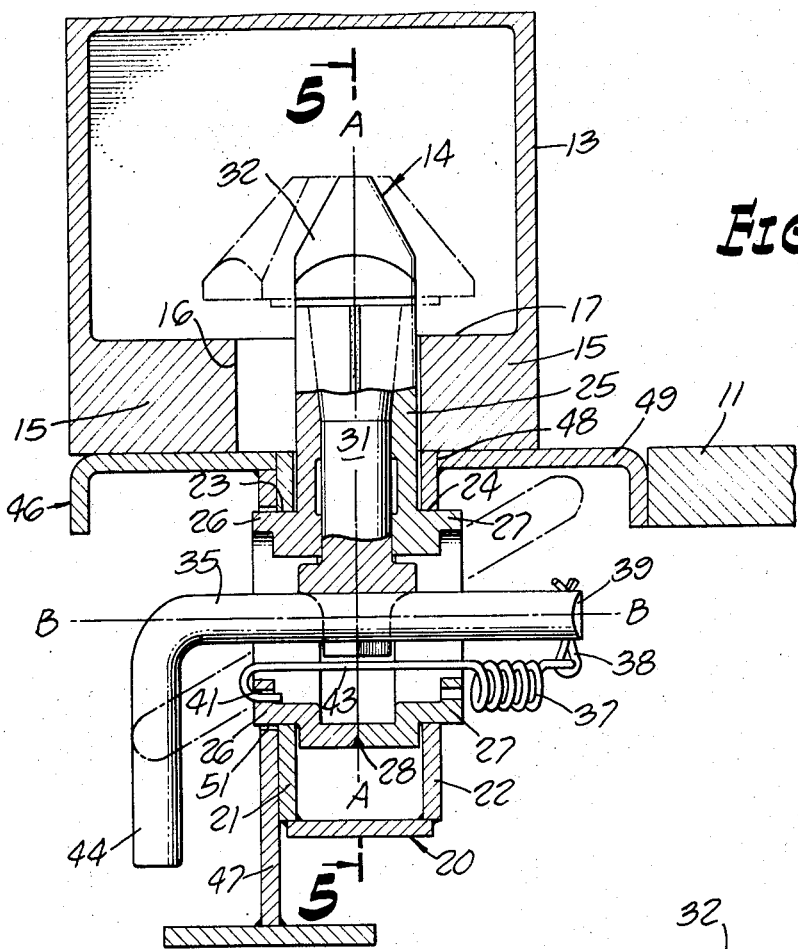
FIG. 4 is a sectional elevation taken substantially on the lines 4—4 as shown in FIG. 2.

Referring to the drawings, the vehicle 10 which may comprise a semi-trailer having a flat bed 11 supports a box-like freight container 12 of conventional design. The container 12 is provided with a plurality of receptacles 13 each of which receives a latching device generally designated 14. As best shown in FIGS. 2 and 4, the receptacle 13 is provided with a wall 15 having an elongated opening 16 and having an upward facing shoulder 17.

Figure 5:
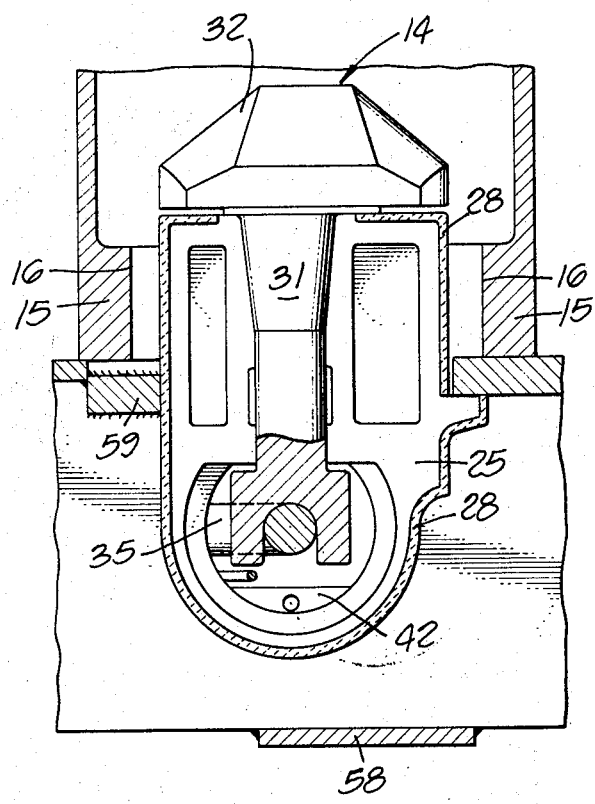
FIG. 5 is a sectional elevation taken substantially on the lines 5—5 as shown in FIG. 4.

In accordance with this invention, the latching device 14 includes a body 20 having a pair of stationary parallel plates 21 and 22 provided with aligned bearing openings 23 and 24. A housing 25 between said plates 21 and 22 is provided with oppositely extending hollow trunnions 26 and 27 which turn in the bearing openings 23 and 24, respectively. The housing 25 is formed of two parts joined together by weld metal strips 28 (see FIGS. 4 and 5).

A twist lock member 31 is mounted within the housing 25 to turn about an axis A—A intersecting the trunnion axis B—B at right angles. A portion of the twist lock member 31 projects from the housing 25 and is provided with an offcenter enlarged head 32. A lever 35 is fixed to the bifurcated lower end 34 of the twist lock member 31, as by welding, and the lever projects through both of the hollow trunnions 26 and 27. An overcenter tension spring element 37 is pivotally connected by fitting 38 to the projecting end 39 of the lever 35. The other end of the spring element 37 is connected at 41 to an apertured fin 42 in the remote trunnion 26. The portion 43 of the spring member 37 extends through the interior of the housing 25. One end of the lever 35 is bent at right angles to form a handle 44 which is accessible from the side of the vehicle.

The body 20 is installed on the frame of the vehicle so that no part of it projects above the flat bed 11 thereof. For existing vehicles having side frame beams of the type shown at 46, the side plate 21 of the body 20 is welded to one side of the vertical web 47 of the beam 46. The upper ends of the parallel plates 21 and 22 project into an opening 48 cut into the horizontal flange 49 of the beam 46 and are welded to the flange 49. The trunnion 26 projects through a clearance opening 51 cut in the web 47. It will be observed that very little structural damage is done to the side frame beam 46 by the installation of body 20 of the latching device 14.

An opening 52 (FIG. 3) between the plates 21 and 22 is partially closed by means of a hinge plate 53 having an intergral pin 54 mounted in aligned openings 55 provided in the plates 21 and 22. One end of the hinge plate 53 rests by gravity on the shoulder 56 provided on the housing 25. When the latching device 14 is in its inoperative retracted position shown by the phantom lines in FIG. 2, the stop surface 57 on the housing engages the body cross plate 58 so that the housing 25 and head 14 are positioned between the side plates 21 and 22 and lie wholly below the flat bed surface 11. When it is desired to move the latching device 14 to its upright operative position shown in full lines in FIG. 2, the hinge plate 53 is manually lifted to its phantom line position and the head 32 and housing 25 are then manually lifted to turn about the trunnion axis B—B until the housing 25 engages the stop lug 59 on the body 20. The hinge plate 53 is then lowered to its full line position wherein it cooperates with the stop lug 59 to hold the housing 25 in upright position.

Figure 3:
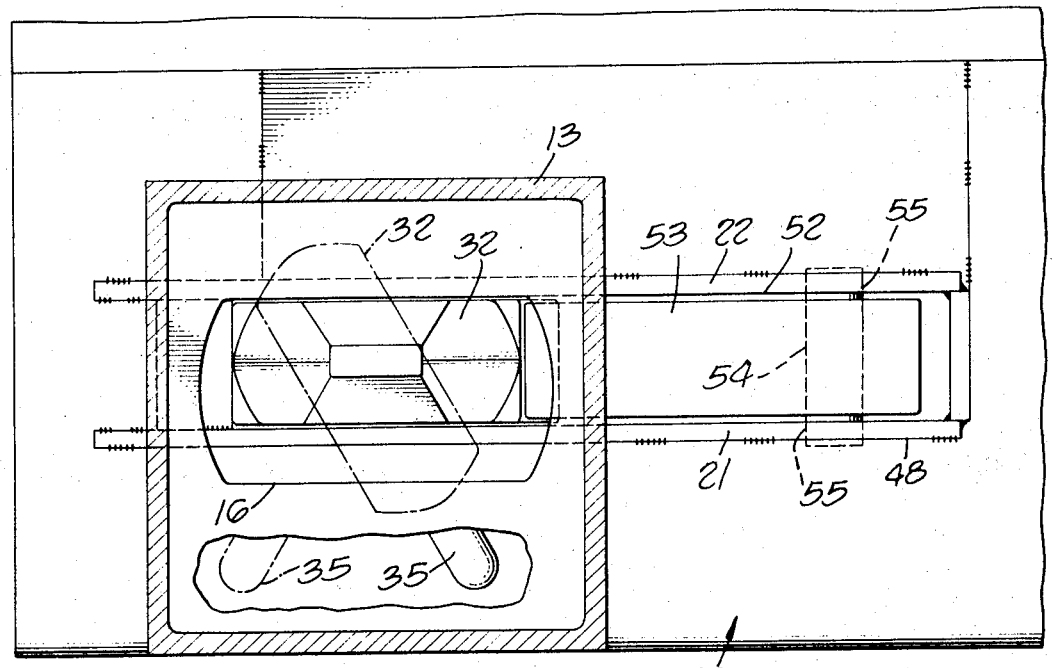
FIG. 3 is a sectional plan view taken substantially on the lines 3—3 as shown in FIG. 2.
Figure 6:
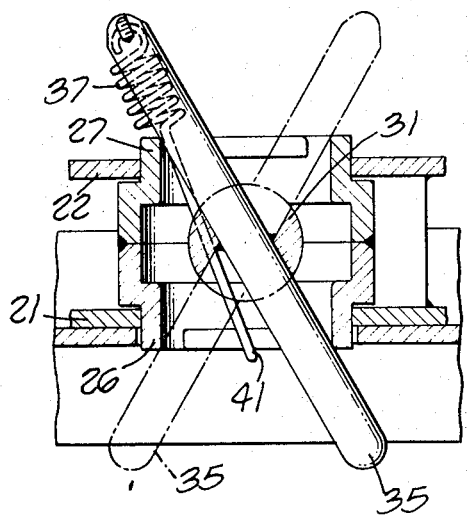
FIG. 6 is a sectional plan view taken substantially on the lines 6—6 as shown in FIG. 2.

The container 12 is then lowered by means of a crane, not shown, so that one of its receptacles 13 is aligned with the latching device 14, and so that the head 32 and housing 25 project upward through the elongated opening 16 in the receptacle 13. In FIG. 4 it will be observed that the housing 25 is not positioned centrally of the receptacle opening 16, but is positioned at one side of the opening 16. The handle 45 of the lever 39 is then manually moved to turn the head 32 from the full line position shown in FIG. 4 to the phantom line position, this turning motion taking place around the axis A—A. Portions of the head 14 then extend beyond the side edges of the receptacle opening 16 and overlie the shoulders 17. This latter position of the head 32 is best shown by the phantom lines in FIG. 3. The lever moves from the full line position as shown in FIGS. 3 and 6 to the phantom line position. It will be observed in FIG. 6 that the overcenter spring element 37 holds the lever 35 in either the full line position or the phantom line position.

When the container 12 has been removed from the flat bed 11 of the vehicle, and when it is desired to return the latching device to its retracted inoperative position, the hinge plate 53 is swung about its pivot pin toward or beyond the phantom line position shown in FIG. 2, and the latching device 14 is then moved manually in a clockwise direction, as shown in FIG. 2, until it reaches the phantom line position. The hinge plate 53 is then allowed to return by gravity to rest on a side face of the housing 25. It will be observed that the latching device 14 can only be returned to its retracted inoperative position when the head 32 is in its full line position, as shown in FIG. 3.

Figure 7:
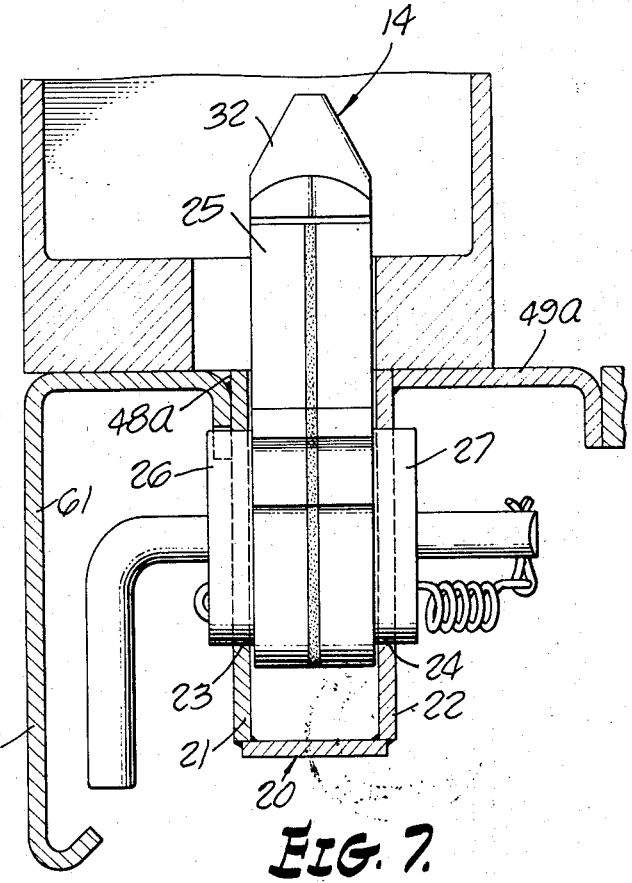
FIG. 7 is a view similar to FIG. 4 showing a modified form of trailer side beam.

The modification of FIG. 7 uses the same latching device 14 but it is mounted on a side frame beam 46a having a different cross sectional shape than the beam 46 previously described. The beam 46a has no central web, but it does have a long vertical flange 61 defining the side edge of the flat bed of the vehicle. The stationary body 20 is welded within an opening 48a formed in the upper flange 49a of the beam 46a. The parallel plates 21 and 22 with their openings 23 and 24 receive the trunnions 26 and 27 of the housing member 25, and the lever 35 turns the head 32, all as previously described.

Having fully described my invention, it is to be understood that I am not to be limited to the details herein set forth but that my invention is of the full scope of the appended claims.

I claim:

1. In a disappearing twist lock assembly for securing a box-like shipping container with lock receptacles to the flat bed of a vehicle, the improvement comprising, in combination: a support member secured to the vehicle, a rockable member, aligned bearing openings on one member receiving oppositely projecting hollow trunnions on the other member whereby the rockable member may turn about a first axis, a twist lock member mounted on said rockable member to turn about a second axis intersecting said first axis at right angles, said twist lock member having a portion extending from said rockable member and provided with a laterally extending head, the rockable member and twist lock member being movable as a unit about said first axis to swing said head into operative position above the flat bed of the vehicle for subsequent reception into a lock receptacle of the container, a lever secured to the twist lock member and projecting through at least one of said hollow trunnions for turning said twist lock member about said second axis and thereby turn said head within the receptacle.

2. The combination set forth in claim 1 in which the aligned bearing openings are provided on the stationary member and the hollow trunnions are mounted on the rockable member.

3. The combination set forth in claim 1 in which the rockable member comprises a housing within which the twist lock member is mounted to turn.

4. The combination set forth in claim 1 in which overcenter means including resilient means are operatively positioned between said rockable member and said lever to hold said twist lock member in either of two positions relative to the rockable member.

5. In a disappearing twist lock assembly for securing a box-like shipping container with lock receptacles to the flat bed of a vehicle, the improvement comprising, in combination: parallel stationary walls on the vehicle provided with aligned bearing openings, a housing between said walls and having oppositely projecting hollow trunnions mounted to turn in said bearing openings about a first axis, a twist lock member mounted in said housing to turn about a second axis intersecting said first axis at right angles, said twist lock member having a portion extending from said housing and provided with an enlarged head, the housing and twist lock member being movable as a unit about said first axis to swing said head between an inoperative position below the flat bed of the vehicle and an operative position above the flat bed for subsequent reception into a lock receptacle of the container, a lever secured to the twist lock member and projecting through at least one of said hollow trunnions for turning said twist lock member about said second axis and thereby turn said head within the receptacle.

6. The combination set forth in claim 5 in which overcenter means including resilient means are operatively positioned between said housing and said lever to hold said twist lock member in either of two positions relative to said housing.

7. The combination set forth in claim 5 in which said lever projects through both of said hollow trunnions, and overcenter means including a spring pivotally attached to a projecting end of the lever and to the remote trunnion to hold said twist lock member in either of two positions relative to the housing member.

8. The combination set forth in claim 5 in which a plate is hinged to the parallel stationary walls to cover said head and a portion of the housing in inoperative position, and also to act as a stop to hold the housing in operative position.

9. In a disappearing twist lock assembly of the type described, the improvement comprising, in combination: a body adapted to be secured to the vehicle, the body having parallel stationary walls provided with aligned bearing openings, a housing between said walls and having oppositely projecting hollow trunnions mounted to turn in said bearing openings about a first axis, a twist lock member mounted in said housing to turn about a second axis intersecting said first axis at right angles, said twist lock member having a portion extending from said housing and provided with an enlarged head, the housing and twist lock member being movable about said first axis to swing said head about one-quarter turn, a lever secured to the twist lock member and projecting through at least one of said hollow trunnions for turning said twist lock member relative to said housing about said second axis.

10. The combination set forth in claim 9 in which said lever projects through both of said hollow trunnions, and overcenter means including a spring pivotally attached to a projecting end of the lever and to the remote trunnion to hold said twist lock member in either of two positions relative to the housing member.

11. As a subcombination: a housing having oppositely projecting hollow trunnions for turnably supporting the housing for movement about the axis of the trunnions, a twist lock member mounted in said housing to turn about a second axis intersecting the trunnion axis at right angles, said twist lock member having a portion projecting from said housing and provided with a laterally extending head, a lever secured to the twist lock member and projecting through both of said hollow trunnions for turning the twist lock member relative to the housing about said second axis, and a spring connected between an extending end of said lever and the remote trunnion for holding said twist lock member in either of two positions with respect to said housing.

* * * * *